United States Patent [19]

Sheehan et al.

[11] Patent Number: 5,303,458
[45] Date of Patent: Apr. 19, 1994

[54] METHOD AND APPARATUS FOR DETECTING AND COMPENSATING THERMAL GROWTH IN MACHINE TOOLS

[75] Inventors: Terrence M. Sheehan, Elmira; Daniel P. Soroka, Horseheads; Takahiro Matsubara, Horseheads; Raymond C. Cady, Horseheads; Gregory Ayzenshtok, Horseheads, all of N.Y.; Gary L. Comstock, Gillett, Pa.

[73] Assignee: Hardinge Brothers, Inc., Elmira, N.Y.

[21] Appl. No.: 861,420

[22] Filed: Mar. 31, 1992

[51] Int. Cl.⁵ ............................................. B23B 25/06
[52] U.S. Cl. ..................................... 29/405; 82/133; 82/900; 82/118; 409/135
[58] Field of Search ................. 82/1.11, 900, 118, 133, 82/134; 409/135; 51/322, 165.73; 29/405

[56] References Cited

U.S. PATENT DOCUMENTS

| | | | |
|---|---|---|---|
| 2,664,787 | 1/1954 | Plimmer | 90/13 |
| 2,956,344 | 10/1960 | Rantsch | 33/174 |
| 3,427,906 | 2/1969 | Berly | 82/900 X |
| 4,520,700 | 6/1985 | Herzog | 82/31 |
| 4,530,626 | 7/1985 | Sabbioni | 409/10 |
| 4,998,957 | 3/1991 | Youden | 82/900 X |
| 5,005,452 | 4/1991 | Wood, III | 82/132 |

Primary Examiner—Z. R. Bilinsky
Attorney, Agent, or Firm—Cushman, Darby & Cushman

[57] ABSTRACT

In summary, therefore, this invention is directed to a thermal growth detector and compensator for detecting and compensating for relative movement between a work holder of a machine tool and a tool holder, that includes an elongated rod made of a material having a coefficient of thermal expansion of substantially zero that is attached at one end thereof to a part of a machine tool, and is attached at another end thereof to a part of a work holder on the machine tool. There is an element disposed at one end of the elongated rod for detecting movement of the rod, and an automatic compensation means is operatively connected to the movement detection element for automatically moving a tool holder relative to the work holder as a function of the movement of the rod detected by the movement detection element to compensate for movement of the work holder relative to the machine tool, whereby any movement of the work holder relative to the tool holder is detected and compensated for by moving the tool holder to compensate for movement of the work holder relative to another part of the machine tool.

32 Claims, 5 Drawing Sheets

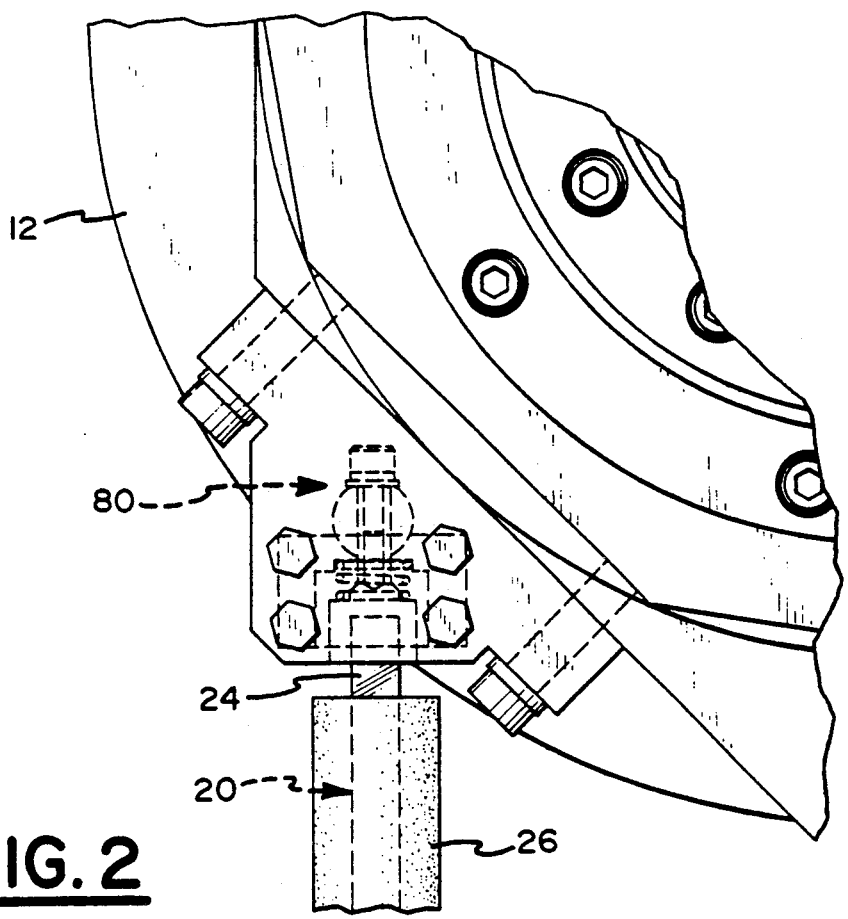
FIG.2
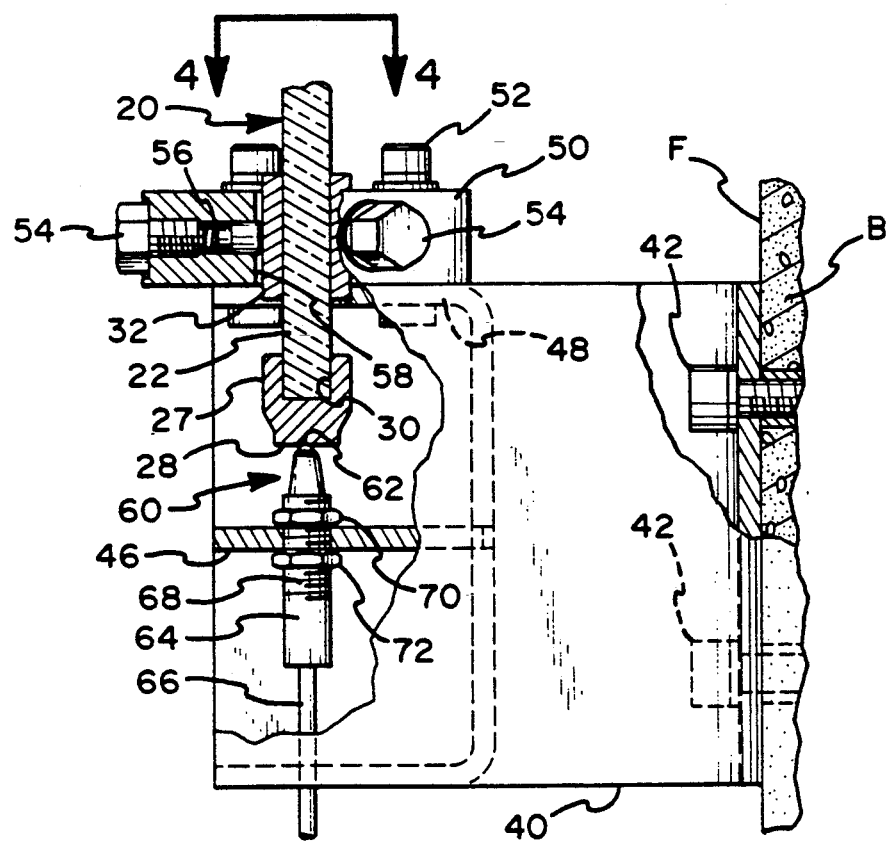

METHOD AND APPARATUS FOR DETECTING AND COMPENSATING THERMAL GROWTH IN MACHINE TOOLS

FIELD OF THE INVENTION

The present invention relates to a method and apparatus for detecting and compensating for thermal growth in machine tools, and to a high precision machine tool incorporating a thermal growth detector and compensator.

BACKGROUND OF THE INVENTION

Those in the high precision machine tool industry are continually searching for better ways of detecting and compensating for errors in the production of parts in the ranges of thousandths and millionths of an inch. Machines are known which automatically compensate for the wear of the cutting tools themselves, for minor deflections of the cutting tools under pressure that introduce errors, and for so-called "thermal growth" of one part of a machine tool relative to another part of the machine tool.

The detection of thermal growth and the compensation therefor has heretofore been somewhat of an art, given that thermal growth is a less predictable error than other types of machining errors, such as tool wear. Past efforts at compensating for thermal growth include the warming up of a machine tool prior to use, so that the majority of the thermal growth occurs prior to using a machine tool for producing parts, and the continuous running of a machine tool in the hope that a constant, stabilized running temperature had been reached. However, it has been found that there is no such thing as a perfect stabilized running temperature, owing to the vagaries of individual machine tools, and to the fluctuations of the environmental temperature of the area in which the machine tool is used. Furthermore, it is time consuming, wearing on machine components, and expensive to idle a machine tool for thirty minutes to an hour prior to use.

An early device for temperature compensation is disclosed in U.S. Pat. No. 2,956,344 to Rantsch, which device required two separate, spaced apart rods exhibiting small thermal expansion, each rod having measuring marks, and a device for detecting the relative displacement of the measuring marks.

In U.S. Pat. No. 2,664,787, a control rod of steel, invar metal, quartz or other material having minimum temperature sensitivity as respects expansion or contraction under normal operating conditions was essentially used as a lever for actuating switches to energize a motor in one of two rotational directions in order to compensate for thermal growth.

U.S. Pat. No. 4,530,626 to Sabbioni discloses a bar made of material of a very low coefficient of thermal expansion that uses a scale or reference element in its detection device so as to measure the distance from a tool to a piece of material to be cut in a gear cutter.

A recent high production machining device is disclosed in U.S. Pat. No. 5,005,452 to Wood, III, in which each of two slides of a machine tool has an associated rod of material such as In-var TM (Ryerson Steel of Cincinnati, Ohio) having a coefficient of linear expansion of only 0.000001 per unit length per °C. An etched glass slide is attached to a reference surface of an upper one of the slides, an optical reading head is utilized to provide a linear position signal to the machine's control unit, and the thermally inert rod of In-var TM is attached to the other one of the slides. One or both of the slides has a linear scale on the low thermal expansion material attached to the reference surface.

OBJECTS AND SUMMARY OF THE INVENTION

A primary object of the invention is to provide a thermal growth detector and compensator for a precision machine tool.

Another object of the invention is to provide a machine tool having thermal growth detection and automatic compensation for the detected thermal growth.

Yet another object of the invention is to provide a thermal growth detector and compensator which uses a non-calibrated rod of low thermal expansion material.

Still another object of the invention is to provide a thermal detector and compensator using a rod having a coefficient of thermal expansion of essentially zero.

A still further object of the invention is to provide a thermal compensator and detector for a machine tool that uses a single rod having low thermal expansion.

A yet another object of the invention is to provide a thermal growth detector and compensator using a linear variable differential transducer (LVDT) sensor and associated LVDT.

A yet still further object of the invention is to provide a thermal growth detector and compensator that uses a rod having a low coefficient of thermal expansion as a force-transmitting member for actuating a pressure-sensitive sensor that eliminates the need for calibrations on the rod having a coefficient of thermal expansion of substantially zero.

Another object of this invention is to provide means for avoiding a "crash" by permitting corrections only in small increments.

It is yet a further object of the invention to eliminate the pre-warming of a machine tool, as well as eliminating the continuous running of a machine tool, for maintaining thermal stabilization.

It is yet another object of the invention to eliminate the requirement of re-calibrating calibrated linear scales.

It is another further object of the invention to provide a high precision machine tool capable of producing machining parts produced from a cold machine at start-up, and machining parts over a several hour period, the precision of the parts being held to within 0.000050 inch (50 millionths of an inch).

It is yet a further object of the invention to produce one hundred pieces over the course of a day, while maintaining tolerances to within 50 millionths (0.000050 inch), with a warming-up time being eliminated, by starting production of machined pieces with a cold machine tool.

In summary, therefore, this invention is directed to a thermal growth detector and compensator for detecting and compensating for relative movement between a work holder of a machine tool and a tool holder, that includes an elongated rod made of a material having a coefficient of thermal expansion of substantially zero that is attached at one end thereof to a part of a machine tool, and is attached at another end thereof to a part of a work holder on the machine tool. There is an element disposed at one end of the elongated rod for detecting movement of the rod, and an automatic compensation means is operatively connected to the movement detection element for automatically moving a tool holder relative to the work holder as a function of the movement of the rod detected by the movement detection element to compensate for movement of the work holder relative to the machine tool, whereby any movement of the work holder relative to the tool holder is detected and compensated for by moving the tool holder to compensate for movement of the work holder relative to another part of the machine tool.

A method for detecting thermal growth and compensating for thermal growth in a machine tool is also disclosed.

BRIEF DESCRIPTIONS OF THE DRAWINGS

FIG. 2 is a partial sectional view of the machine tool of FIG. 1, on an enlarged scale;

DETAILED DESCRIPTION OF THE INVENTION FIGS. 1-4

Figure 1:
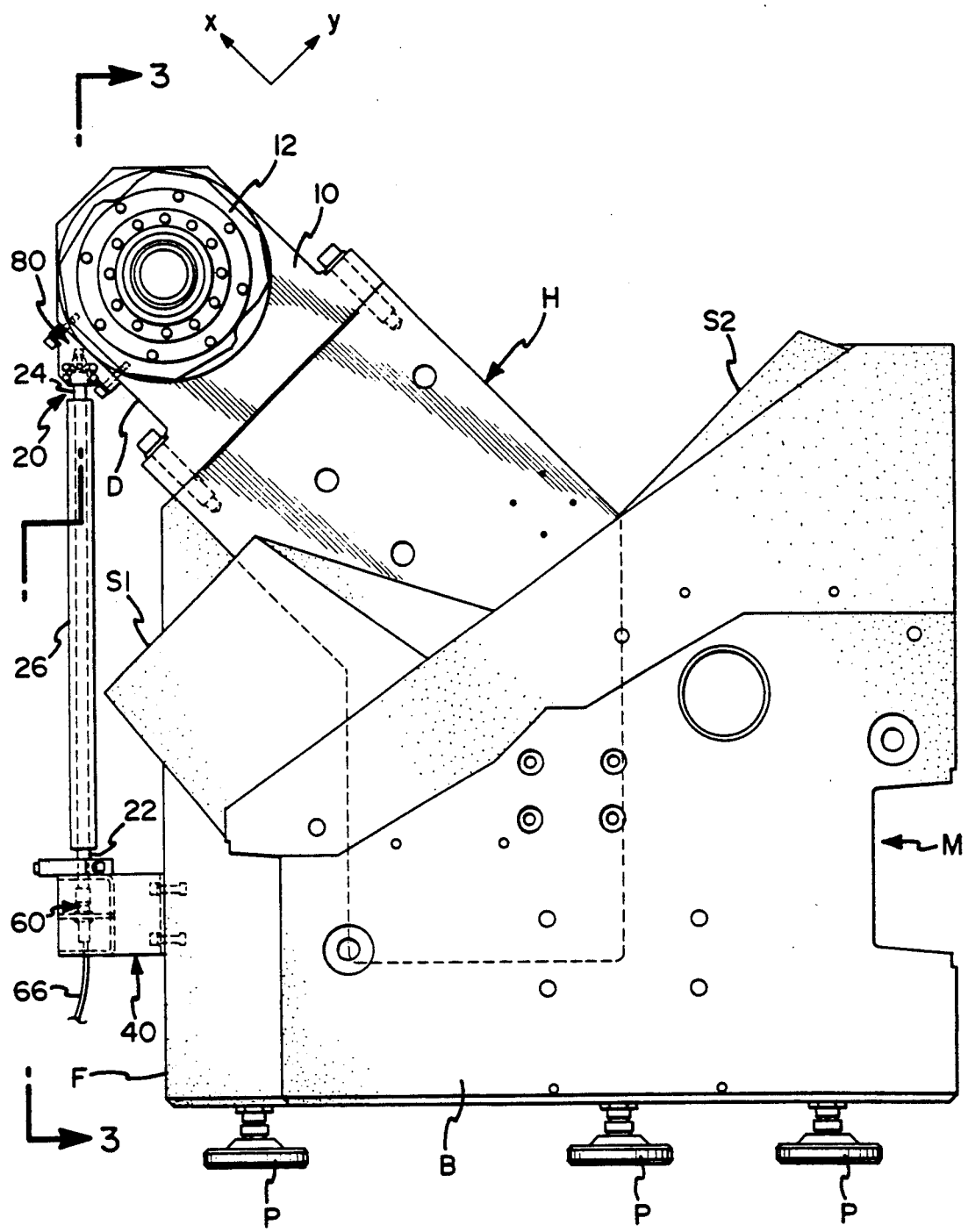
FIG. 1 is a side elevational view of a machine tool according to the invention.
Figure 5:
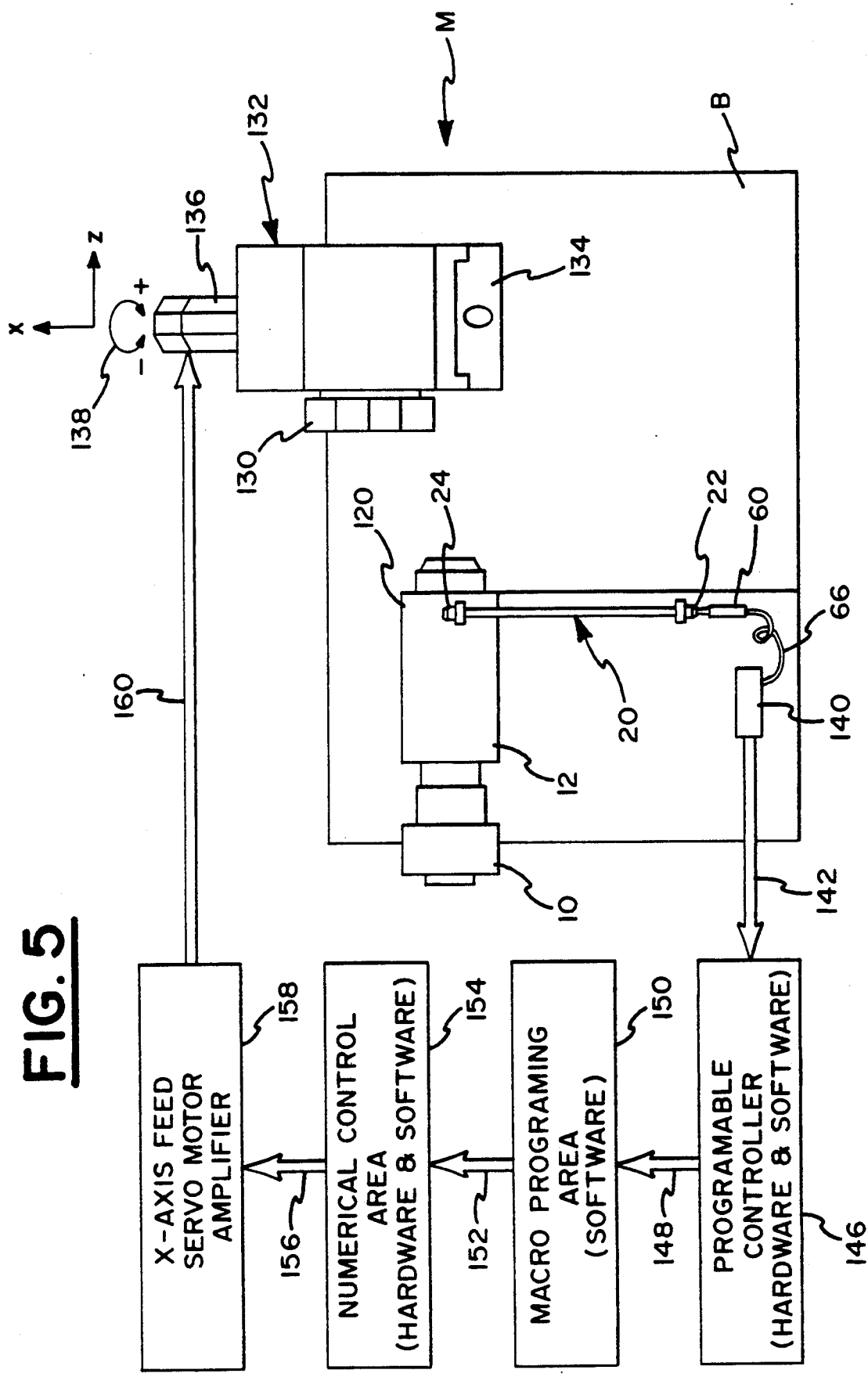
FIG. 5 is a schematic view of a computer numerical control (CNC) precision machine tool having thermal growth detection and compensation according to the invention.

FIG. 1 shows a precision machine tool M having a bed or base B into which a headstock support structure H is inserted. Headstock support structure H is generally made of steel and is cast into base B, which is generally a cementitious material, such as concrete. A headstock assembly 10, having a headstock 12 with an angled face D attached thereto, is fixed to headstock support structure H. Each of these components generally has a coefficient of thermal expansion different from the coefficient of thermal expansion of the other components. Known support pedestals P stabilize and level precision machine tool M. There is a first guideway or slideway support surface S1 and a second guideway or slideway support surface S2 defined on respective upper sloped surfaces of base B, and extending in respective planes defined by the x-axis and z-axis, as the axes are defined in the machine tool industry. For clarity, the slideways which are slidable in the direction of the z-axis, and which support tool holder carriages movable in the x-axis and/or z-axis are shown in FIG. 5, and described in greater detail below. Bed B defines a longitudinal axis.

An elongated rod 20 has a lower, first end 22 and an upper, vertically spaced apart second end 24. Elongated rod 20 is preferably made of a glass material having a coefficient of thermal expansion of substantially zero, and may be provided with a thermal insulating sleeve or insulator 26 for reducing temperature fluctuations to which rod 20 is subjected, in a preferred embodiment of the invention.

Figure 3:
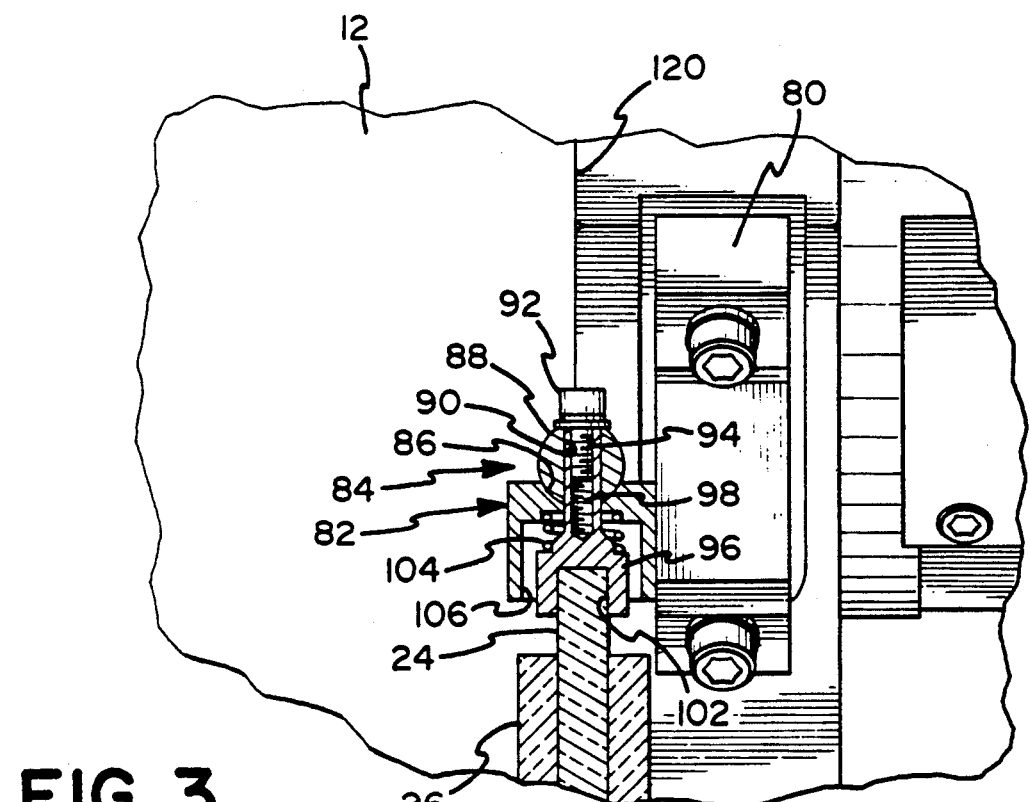
FIG. 3 is a partial sectional view, taken along line 3—3, of the front of the machine tool of FIG. 1, on an enlarged scale.
Figure 3:
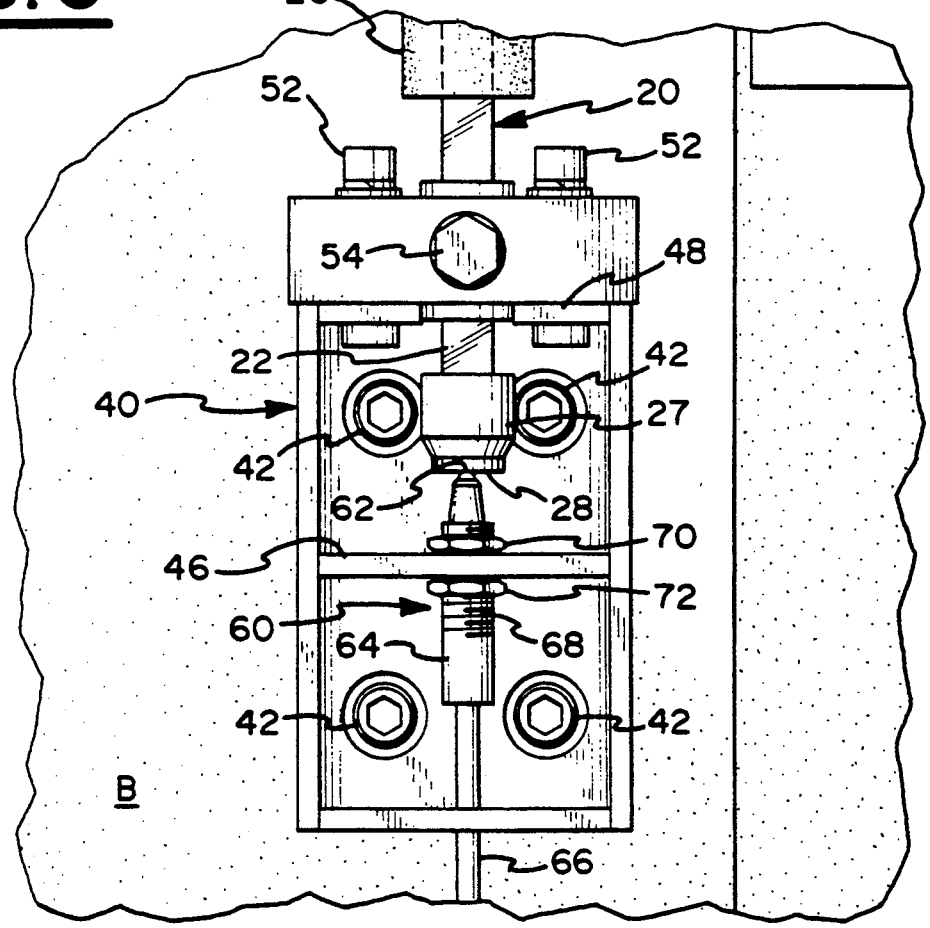
Figure 4:
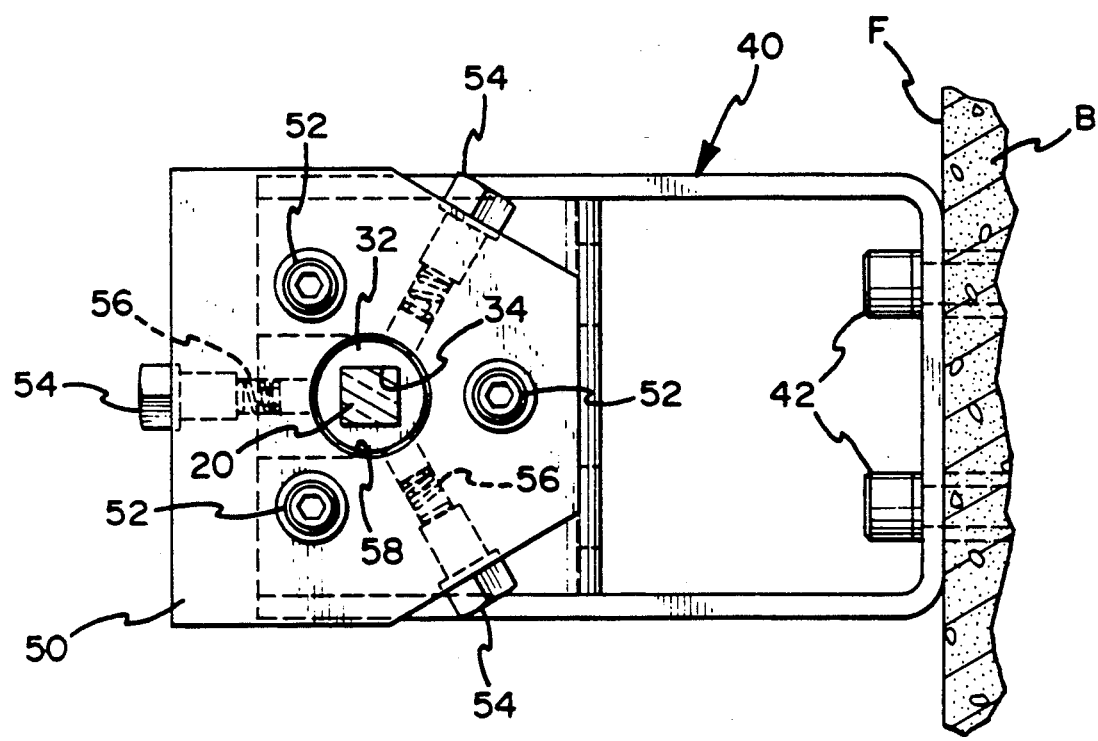
FIG. 4 is a sectional view of a part of the machine tool taken along line 4—4 of FIG. 2.

Turning to FIGS. 2, 3 and 4, which are enlarged, partially sectional views of machine tool M of FIG. 1, the manner in which rod 20 is attached to base B is shown. A metal cap 27 having a lower surface 28 and a square aperture 30 defined therein is received on lower end 22 of rod 20. A support sleeve 32 through which a square aperture 34 extends, guidingly receives elongated rod 20. A lower rod support bracket 40 attaches lower end 22 of rod 20 to base B of the machine tool by means of fasteners 42. Lower rod support bracket 40 includes a lower support arm 44, a middle support arm 46, and an upper support arm 48.

A lower rod support member 50 is fixedly attached to upper support arm 48 by a plurality of screws 52. A plurality of springloaded set screws 54, on which respective springs 56 are placed for maintaining a sufficient preload to ensure that set screws 54 do not loosen, adjustably fixedly retain support sleeve 32 within a hole 58 defined through lower rod support member 50. In this manner, stray lateral (i.e., transverse to the longitudinal axis of rod 20) movement is substantially eliminated, while allowing the transmission of forces resulting from thermal growth to be accurately sent to and accurately sensed at lower end 22 of rod 20 by a sensor 60, which preferably is a linear variable differential transducer (LVDT).

Sensor 60 includes a pressure-sensitive contact 62 which normally contacts lower surface 28 of metal cap 27. Sensor 60 can be a known device available in the industry, and has a body 64 housing conventional components for translating the force sensed by pressure-sensitive contact 62 into an analog electrical signal which is transmitted through an electrical cable 66 to appropriate numerical control hardware and software described in detail below in a regard to FIG. 5. Body 64 can be provided with threads 68, whereby an upper adjustable locking member or locking nut 70 disposed on one side of middle support arm 46, can cooperate with a lower adjustable locking nut 72 for fixedly adjustably securing sensor 60 to middle support arm 46 and, hence, to bed B of the machine tool M.

Turning specifically to FIG. 3, while continuing to refer to FIGS. 1, 2 and 4, the manner in which upper, second end 24 of rod 20 is connected to headstock 12, is shown in more detail. A ball joint mount and upper rod support bracket 80 is rigidly, detachably attached to headstock 12. Upper bracket 80 includes a support arm 82 that supports a ball joint 84. Ball joint 84 comprises a concave hemispherical surface 86 defined in support arm 82, and a ball 88 having a through aperture 90. A securing cap 92 having an externally threaded extension 94 secures ball 88 to a coupler 96 having internal threads 98. Extension 94 is inserted through aperture 90 and mates with internal threads 98. At the opposite end of coupler 96, a square aperture 102 is provided for receiving and securely mating with upper end 24 of rod 20.

A spring 104 establishes a predetermined preload for reducing undesired relative movement between rod 20, headstock 12, and base B. A recess 106 is provided in support arm 82 so that interference-free movement of rod 20 in directions transverse to the longitudinal axis of rod 20 is possible. This manner of attaching upper, second end 24 of rod 20 to headstock 12 allows for extremely accurate placement of rod 20 relative to headstock 12 and base B, allows the longitudinal axis of rod 20 to be at an acute angle relative to a plane defined by angled face D, and causes thermal growth of headstock 12 relative to base B, and, hence, relative to a working tool (FIG. 5) to be accurately reflected by the movement of rod 20 relative to sensor 60.

FIG. 5

FIG. 5 schematically shows associated hardware and software for computer numerical control (CNC) for controlling machine tool M as a function of the movement of rod 20 corresponding to thermal growth of headstock 12. Preferably, upper, second end 24 of elongated rod 20 is connected to a front end 120 of headstock 12, front end 120 being the working end of headstock 12, the movement of which gives the most accurate data for controlling the correcting movement of a working tool or tool holder 130. Tool holder 130 is supported on a tool holder carriage 132, which in turn is supported on a tool base 134. Tool holder carriage 132 is movable along the x-axis by a feed servo motor 136, having a direction of rotation 138. Tool base 134 is movable along the z-axis by actuators which are not shown for clarity.

A transducer 140, such as a linear variable differential transducer, is operatively connected to sensor 60 by analog electrical signal transmission cable 66. Transducer 140 transmits binary code decimal (BCD) data 142 to a programmable controller 146. Programmable controller 146 includes hardware and software. Data 148 from programmable controller 146 is transferred (such as through a macro window) to a macro programming area 150 which comprises software. Macro programming area 150, in turn, transmits offset data 152 to a numerical control area 154 which includes hardware and software. Numerical control area 154 transmits a control signal 156 to an x-axis feed servo motor amplifier 158. The x-axis feed servo motor amplifier sends electrical signals 160 to x-axis feed servo motor 136 for controlling the direction of rotation 138 thereof, and, accordingly, the direction of movement of tool holder carriage 132 along the x-axis for achieving the desired result of compensating for the position of tool holder 130 relative to headstock 12 so that the thermal growth detected is compensated.

OPERATION

In use, lower end 22 of rod 20 is connected to front face F of base B of a machine tool by lower rod support bracket 40. Upper end 24 of rod 20 is pivotably securedly attached to the angled face D of front end 120 of headstock 12 by upper bracket 80. Ball joint 84 allows for the accurate placement and connection of upper end 24 of rod 20 to angled face D of headstock 12. If necessary, one or more of set screws 54 is adjusted for aligning support sleeve 32 with lower end 22 of rod 20. Adjustable locking nuts 70 and 72 are likewise loosened and retightened as will be understood by one skilled in the art, so that pressure-sensitive contact 62 of sensor 60 is held in proper abutting contact with lower surface 28 of metal cap 27. After the relationship between head 12, rod 20, sensor 60, and base B is established, then the machine tool M can be turned on for producing machined parts.

After machine M is turned on, any thermal growth of front part 120 of headstock 12 causes movement of rod 20 against pressure-sensitive contact 62 of sensor 60. Sensor 60 transmits an analog electrical signal corresponding to the amount of movement of rod 20 to transducer 140. Transducer 140 converts the analog signal into BCD data 142, sending the BCD data to programmable controller 146. Programmable controller 146 converts BCD data 142 into signal 148 containing information (i.e., data transferable through a macro window) to macro programming area 150, which takes part in the calculation of the headstock growth information corresponding to appropriate x-axis direction displacement data, such as by appropriate trigonometric and geometric functions, and other headstock displacement calculation functions, as will be well understood by those skilled in the art. In addition, the computer program will have appropriate algorithms for calculating the required working tool displacement, for example, given that the longitudinal axis of rod 20 will generally intersect the plane contained in angled face D at an acute angle.

Macro programming area 150 then sends thus-calculated offset data 152 to numerical control area 154. Numerical control area 154 has the hardware and software for computing the triggering of control signal 156 for x-axis feed servo motor amplifier 158 at the appropriate time, such control including appropriate software functions to ensure that there is no so-called "crash" (i.e., actual, unintended physical contact) between working tool or tool holder 130 and headstock 12, more precisely, between tool holder 130 and a work piece (not shown) being worked on while being held by headstock 12. For example, there can be a function in the program for tracking incremental changes so that when the program shifts from single digit millionths of an inch (of detected thermal growth), a different part of the program takes over as another feature of the numerical control program, to avoid "crash" situations; likewise, appropriate software commands can be inserted to allow changes in the position of tool holder 130 of only less than 500 millionths of an inch, except immediately after the machine tool is first turned on.

When the numerical control area 154 has determined that a correcting movement of tool holder 130 is required as a function of the thermal growth of headstock 12 detected, then control signal 156 is sent to x-axis feed servo motor amplifier 158, which generates appropriate electrical signal 160 thereby actuating x-axis feed servo motor 136 in the appropriate direction of rotation 138 for moving tool holder carriage 132 in the appropriate increment along the x-axis. Working tool or tool holder 130 is, thus, moved the required distance to compensate for thermal growth of headstock 12. As will be readily apparent, software programming containing checks and balances, and other information feedback, for example, can be included to make certain that macro programming area 150 sends out offset data signals only under appropriate conditions.

The material used for elongated rod 20 is glass, preferably ULE TM supplied by Corning Incorporated, Corning, N.Y., which has a coefficient of thermal expansion of $0 \times 10^{-9}/°C.$ (0 ppb/°C.) in the range of 5°-35° C. The cross section of rod 20 is preferably square, although circular cross sections are likewise usable.

While this invention has been described as having a preferred design, it is understood that it is capable of further modifications, uses and/or adaptations of the invention following in general the principle of the invention and including such departures from the present disclosure as come within the known or customary practice in the art to which to invention pertains and as may be applied to the central features hereinbefore set forth, and fall within the scope of the invention and of the limits of the appended claims.

We claim:

1. A thermal growth detector and compensator for detecting and compensating for relative movement between a front of a headstock of a machine tool and a tool holder, comprising:

an elongated rod having first and second spaced opposed ends;

said elongated rod comprising a material having a coefficient of thermal expansion of substantially zero;

means disposed at said first end of said elongated rod for connecting said rod to a part of the machine tool;

means disposed at said second end of said elongated rod for connecting said second end of said rod to the front of the headstock at a point vertically spaced apart from said first end of said rod;

means disposed at one of said first and second ends of said elongated rod for detecting movement of said rod; and automatic compensation means operatively connected to the movement detection means for automatically moving the tool holder relative to the headstock as a function of the vertical movement of the rod detected by said movement detection means to compensate for movement of the front of the headstock relative to a part of the machine tool;

whereby, any vertical movement of the front of the headstock relative to the tool holder is detected and compensated for by moving the tool holder to compensate for movement of the front of the headstock relative to the part of the machine tool.

2. A thermal growth detector and compensator as defined in claim 1, wherein:

a) said means for connecting said first end of said rod to a part of a machine tool includes a bracket for attaching said first end of said rod to a base of a machine tool.

3. A thermal growth detector and compensator as defined in claim 1, wherein:

a) tensioning means is disposed at one of said first and second ends of said elongated rod for tensioning said rod.

4. A thermal growth detector and compensator as defined in claim 3, wherein:

a) said elongated rod comprises glass.

5. A thermal growth detector and compensator as defined in claim 4, wherein:

a) said elongated rod has a substantially rectangular cross section.

6. A thermal growth detector and compensator as defined in claim 4, wherein:

a) said coefficient of thermal expansion is substantially zero within a temperature range of 5° to 35° Celsius.

7. A thermal growth detector and compensator as defined in claim 6, wherein:

a) said coefficient of thermal expansion is $0 \times 10^{-9}/°C$.

8. A thermal growth detector and compensator as defined in claim 1, wherein:

a) said elongated rod comprises glass.

9. A thermal growth detector and compensator as defined in claim 1, wherein:

a) said coefficient of thermal expansion is substantially zero within a temperature range of 5° to 35° Celsius.

10. A thermal growth detector and compensator as defined in claim 1, wherein:

a) said elongated rod comprises only one rod.

11. A thermal growth detector and compensator as defined in claim 1, wherein:

a) said elongated rod lacks calibrating markings.

12. A machine tool having thermal growth detection and compensation, comprising:

a) a tool bed defining a longitudinal axis;

b) a work holder attached to said tool bed;

c) a tool holder movably attached to said tool bed and spaced apart from said work holder along said longitudinal axis;

d) a rod having first and second ends, said rod extending substantially transversely to said longitudinal axis, said first end being disposed adjacent to a part of said machine tool, and said second end being disposed adjacent to said work holder;

e) said rod comprising a material having a coefficient of thermal expansion of substantially zero;

f) means disposed at one of said first and second ends of said elongated rod for detecting movement of said rod transverse to said longitudinal axis;

g) compensation means operatively connected to the movement detection means for moving said tool holder relative to said work holder as a function of the movement of the rod detected by said movement detection means to compensate for movement of said work holder transversely to said longitudinal axis and relative to said tool holder; and h) whereby, any movement of said work holder transverse to said longitudinal axis and relative to said tool holder resulting from thermal growth is compensated for by moving said tool holder, thereby increasing the accuracy of the machine tool.

13. A machine tool as defined in claim 12, wherein:

a) said elongated rod comprises glass.

14. A machine tool as defined in claim 13, wherein:

a) said elongated rod has a substantially rectangular cross section.

15. A machine tool as defined in claim 14, wherein:

a) said coefficient of thermal expansion of said rod is substantially zero within a temperature range of 5° to 35° Celsius.

16. A machine tool as defined in claim 15, wherein:

a) said elongated rod comprises glass.

17. A machine tool as defined in claim 16, wherein:

a) said coefficient of thermal expansion is substantially $0 \times 10^{-9}/°C$. within a temperature range of 5° to 35° Celsius.

18. A machine tool as defined in claim 12, wherein:

a) said movement detecting means includes a sensor for generating an analog signal as a function of the movement of said rod;

b) a transducer is operatively connected to said sensor for converting the analog signal to binary code decimal; and c) a programmable controller is operatively connected to said transducer and to said tool holder for receiving the binary code decimal and controlling movement of said tool holder relative to said work holder.

19. A machine tool as defined in claim 12, wherein:

a) said part of said machine tool has a first coefficient of thermal expansion; and b) said work holder has a second coefficient of thermal expansion different from said first coefficient of thermal expansion.

20. A machine tool as defined in claim 12, wherein:

a) said work holder includes a headstock;

b) said tool holder includes a cutting tool;

c) said first end of said rod is attached to said headstock;

d) said second end of said rod is attached to said tool bed; and e) said compensation means controls movement of said cutting tool relative to said headstock.

21. A machine tool as defined in claim 20, wherein:
a) said first end of said rod is attached to a front end of said headstock.

22. A machine tool as defined in claim 12, wherein:
a) a ball connector is disposed on one of said first and second ends of said rod for providing captured angular displacement between said rod and said work holder and said part of said machine tool.

23. A machine tool as defined in claim 12, wherein:
a) said part of said machine tool comprises said tool bed.

24. A machine tool as defined in claim 12, wherein:
a) said tool bed includes a substantially vertical face;
b) said work holder includes a first face extending at an angle relative to said vertical face;
c) one of said first and second ends of said rod is connected to said vertical face, and the other one of said first and second ends of said rod is connected to said first face of said work holder.

25. A machine tool as defined in claim 12, wherein:
a) said tool bed has a substantially horizontal z-axis, a y-axis extending substantially perpendicular to said z-axis and at substantially 45° to a horizontal plane containing said z-axis, and an x-axis extending substantially perpendicular to said z-axis and to said y-axis;
b) said tool bed has a substantially vertical face;
c) said work holder has a first face extending substantially parallel to said y-axis; and
d) said rod is connected at one of said first and second ends to said vertical face, and at the other one of said first and second ends to said first face.

26. A machine tool as defined in claim 12, wherein:
a) said elongated rod comprises only one rod.

27. A machine tool as defined in claim 12, wherein:
a) said elongated rod lacks calibrating markings.

28. A machine tool as defined in claim 12, wherein:
a) a thermal insulator is disposed on said rod.

29. A method to permit immediate machining operation from start-up of a machine tool by detecting and compensating for movement of a work holder relative to the machine bed during the initial and subsequent thermal growth to constant dimension of the work holder by adjusting the tool holder on the machine bed during start-up and subsequent growth of the work holder relative to a work piece positioned in the work holder comprising the steps of:
a) providing a rod having a coefficient of thermal expansion of substantially zero and first and second ends;
b) mounting the first end of a rod to the front end of the work holder;
c) attaching the second end of the rod to the bed of the machine tool at a point vertically spaced apart from the first end of the rod;
d) providing a sensor for detecting vertical movement of the rod adjacent one of the first and second ends thereof for generating a correcting signal as a function of the vertical movement of the rod;
e) converting the signal to binary code decimal; and
f) providing a programmable controller for using the binary code decimal to control movement of the tool holder relative to the work holder to compensate for thermal growth of the work holder.

30. A method as in claim 29, further comprising the step of:
a) adjusting the tool holder in discrete increments of less than 500 millionths of an inch except immediately after start-up of the machine tool.

31. A method as defined in claim 29, wherein:
a) said correcting signal is an analog signal.

32. A method as defined in claim 31, further including the steps of:
a) providing a linear variable differential transducer sensor for generating the analog signal;
b) providing a linear variable differential transducer for generating the binary code decimal; and
c) providing a programmable controller for receiving the binary code decimal signal from the linear variable differential transducer and for converting the binary code decimal signal into data.

* * * * *